US006684252B1

(12) United States Patent
Chow

(10) Patent No.: US 6,684,252 B1
(45) Date of Patent: Jan. 27, 2004

(54) METHOD AND SYSTEM FOR PREDICTING THE PERFORMANCE OF COMPUTER SERVERS

(75) Inventor: Kingsum Chow, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 696 days.

(21) Appl. No.: 09/604,670

(22) Filed: Jun. 27, 2000

(51) Int. Cl.[7] ............................................... G06F 15/16
(52) U.S. Cl. ...................................... 709/228; 709/224
(58) Field of Search ................................. 709/224, 223, 709/228, 203, 217, 218, 219

(56) References Cited

U.S. PATENT DOCUMENTS

| | | | | |
|---|---|---|---|---|
| 5,446,680 A | * | 8/1995 | Sekiya et al. | 709/200 |
| 5,812,780 A | * | 9/1998 | Chen et al. | 709/224 |
| 5,892,937 A | * | 4/1999 | Caccavale | 711/135 |
| 6,292,827 B1 | * | 9/2001 | Raz | 709/217 |
| 6,438,592 B1 | * | 8/2002 | Killian | 709/224 |
| 6,457,143 B1 | * | 9/2002 | Yue | 714/43 |
| 6,480,749 B1 | * | 11/2002 | Lee et al. | 700/32 |

OTHER PUBLICATIONS

Daniel A. Menasce, et al., "Capacity Planning for Web Performance: Metrics, Models, and Methods", 1998, pp. 1–15.
Subbash Sharma, "Applied Multivariate Techniques", University of South Carolina 1996, pp. 1–16.
Sam Kachigan, "Multivariable Statistical Analysis: A Conceptual Introduction", 1991 2nd edition, pp. 236–260.
George E.P. Box, et al. "Statistics for Experimenters: An Introduction to Design, Data Analysis, and Model Building", 1937, pp. 453–483.
"SYSTAT®8.0—Statistics", p. 235.

* cited by examiner

Primary Examiner—Mehmet B. Geckil
(74) Attorney, Agent, or Firm—Pillsbury Winthrop LLP

(57) ABSTRACT

Computers submit requests of different types to a server. The response times of the server to the submitted requests is measured. Then, the average response times of the server is predicted based on the number and types of requests and the measured response times.

32 Claims, 5 Drawing Sheets

Search Interface

Price: $ [ ] to $ [ ]    Keyword(s): [ ]

Search

FIG. 2

LATTICE MIXTURE DESIGN

| Run | Search Parameters | | | | | | ART |
|---|---|---|---|---|---|---|---|
| | 1 | 2 | 3 | 4 | 5 | 6 | |
| 1 | 1.000 | 0.000 | 0.000 | 0.000 | 0.000 | 0.000 | $ART_1$ |
| 2 | 0.000 | 1.000 | 0.000 | 0.000 | 0.000 | 0.000 | $ART_2$ |
| 3 | 0.000 | 0.000 | 1.000 | 0.000 | 0.000 | 0.000 | $ART_3$ |
| 4 | 0.000 | 0.000 | 0.000 | 1.000 | 0.000 | 0.000 | $ART_4$ |
| 5 | 0.000 | 0.000 | 0.000 | 0.000 | 1.000 | 0.000 | $ART_5$ |
| 6 | 0.000 | 0.000 | 0.000 | 0.000 | 0.000 | 1.000 | $ART_6$ |
| 7 | 0.500 | 0.500 | 0.000 | 0.000 | 0.000 | 0.000 | $ART_7$ |
| 8 | 0.500 | 0.000 | 0.500 | 0.000 | 0.000 | 0.000 | $ART_8$ |
| 9 | 0.500 | 0.000 | 0.000 | 0.500 | 0.000 | 0.000 | $ART_9$ |
| 10 | 0.500 | 0.000 | 0.000 | 0.000 | 0.500 | 0.000 | $ART_{10}$ |
| 11 | 0.500 | 0.000 | 0.000 | 0.000 | 0.000 | 0.500 | $ART_{11}$ |
| 12 | 0.000 | 0.500 | 0.500 | 0.000 | 0.000 | 0.000 | $ART_{12}$ |
| 13 | 0.000 | 0.500 | 0.000 | 0.500 | 0.000 | 0.000 | $ART_{13}$ |
| 14 | 0.000 | 0.500 | 0.000 | 0.000 | 0.500 | 0.000 | $ART_{14}$ |
| 15 | 0.000 | 0.500 | 0.000 | 0.000 | 0.000 | 0.500 | $ART_{15}$ |
| 16 | 0.000 | 0.000 | 0.500 | 0.500 | 0.000 | 0.000 | $ART_{16}$ |
| 17 | 0.000 | 0.000 | 0.500 | 0.000 | 0.500 | 0.000 | $ART_{17}$ |
| 18 | 0.000 | 0.000 | 0.500 | 0.000 | 0.000 | 0.500 | $ART_{18}$ |
| 19 | 0.000 | 0.000 | 0.000 | 0.500 | 0.500 | 0.000 | $ART_{19}$ |
| 20 | 0.000 | 0.000 | 0.000 | 0.500 | 0.000 | 0.500 | $ART_{20}$ |
| 21 | 0.000 | 0.000 | 0.000 | 0.000 | 0.500 | 0.500 | $ART_{21}$ |

FIG. 5

METHOD AND SYSTEM FOR PREDICTING THE PERFORMANCE OF COMPUTER SERVERS

BACKGROUND

1. Field of the Invention

The present invention relates to network communications. More particularly, the present invention relates to predicting the performance of computer servers.

2. Description of the Related Art

The Internet is a well-known, global network of cooperatively interconnected computer networks. The World Wide Web ("Web") portion of the Internet is a collection of computer servers that store Web pages, which are accessible by the public. The Web pages consist of text, graphic, audio/visual, and the like (i.e., multimedia).

FIG. 1 shows a simplified diagram of a network. Client computers 115 connect to an Internet Service Provider ("ISP") 110, which provides Internet access to users of client computers 115. ISP 110 connects client computers 115 via a network 105 (i.e., the Internet) to servers 100. A browser, which runs on each of client computers 115, requests Web pages from servers 100. The browser allows the users of client computers 115 to navigate (or "browse") between Web pages.

Web requests may represent a search for information, such as an e-commerce search for a product. As shown in FIG. 2, an e-commerce search interface presents a user with a plurality of options to select as search parameters, such as price range and/or keyword(s). The user selects the search parameters and clicks "search" to effect a search query. Server 100 returns a Web page with a list of matches to the query.

A concern of operators of computer servers 100 is allocating the limited resources of servers 100. The goal of the operators is to allocate the most resources to the most requested Web pages in order to increase access to the most pertinent information. The success of a Web page depends, then, on the performance of servers 100, which store the Web pages, because quick access to information is expected on the Web. Thus, it is crucial for the operators to predict with high certainty the performance of servers 100 in order to allocate their limited resources.

It is well-known in the art that a plurality of concurrent requests impact the performance of a server 100. Thus, the present performance prediction of server 100 is based on the response times of server 100 to concurrent requests by users of client computers 115.

Further, the types of request impact the performance of server 100. For example, for one shopping service, it was determined that the type of request impacts the performance of server 100 by at least a magnitude of three. Because concurrent requests and the types of the requests impact the performance of server 100, the determination of a model of the performance of server 100 must take these two factors into consideration. Otherwise, as determined from tests, the model of the performance of server 100 may miscalculate the actual performance of server 100 by 200%, which does not allow for the proper allocation of limited resources.

In addition, the use of the actual performance of server 100 fails as a basis for allocating limited resources. To begin, it is a measurement of past performance of server 100, and not of future performance, which may only marginally correspond to past performance. More importantly, measuring the performance of server 100 fails to isolate whether the performance fluctuations of server 100 result from an increase in requests or from the types of requests. Accordingly, there is a need in the art for improved performance prediction techniques for computer servers.

BRIEF DESCRIPTION OF THE DRAWINGS

In the drawings, like reference numerals represent similar parts of the present invention throughout the several views and wherein:

FIG. 2 depicts an e-commerce search interface;

FIG. 5 depicts a lattice mixture design.

DETAILED DESCRIPTION

The embodiments of the present invention may be realized in a variety of implementations, including software, firmware, and/or hardware. Hence, the operation and behavior of the present invention will be described without specific reference to the software code or hardware components, it being understood that a person of ordinary skill in the art would be able to design software and/or hardware to implement the present invention, which predicts the performance of computer servers, based on the description herein.

The performance of a computer server is based on the response time of the server to a number of concurrent requests of different types. The types of requests to the server vary, and may depend on the mixture (or selection) of search parameters for a query. For instance, a shopping service may provide an e-commerce search interface with a plurality of search parameters (see FIG. 2), such as price range, keyword and/or plurality of keywords. In most search interfaces, logic operators, such as "and" and "or," connect the plurality of keywords. The capacity of the server, however, may be adjusted to satisfy a response time, which fluctuates based on the concurrent requests, and the type(s) of the requests. This capacity calculation enables an operator of server to allocate its limited resources.

Figure 1:
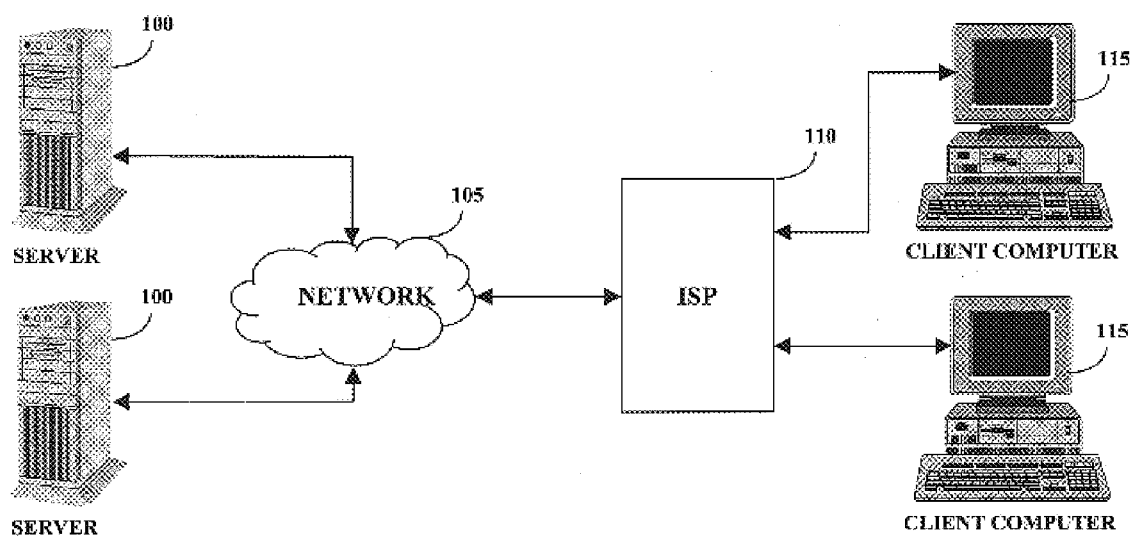
FIG. 1 depicts a simplified diagram of a network.
Figure 3:
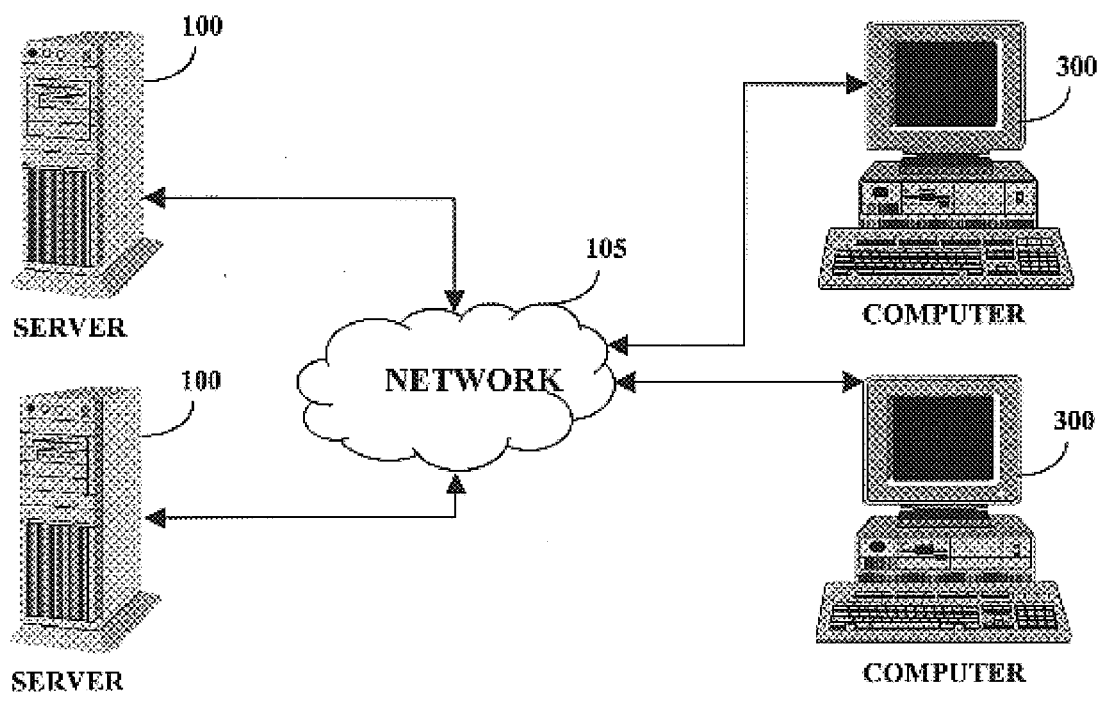
FIG. 3 depicts computers to predict the performance of computer servers.

FIG. 3 depicts a simplified diagram of an exemplary embodiment. Computers 300 comprise agents that emulate users of computers 300. Computers 300 store the agents in a computer readable medium, such as a memory or storage device. Computers 300 connect to servers 100 via a network 105, such as a backbone. This embodiment enables the agents to request, for instance, Web pages from servers 100, which store Web pages.

Figure 4:
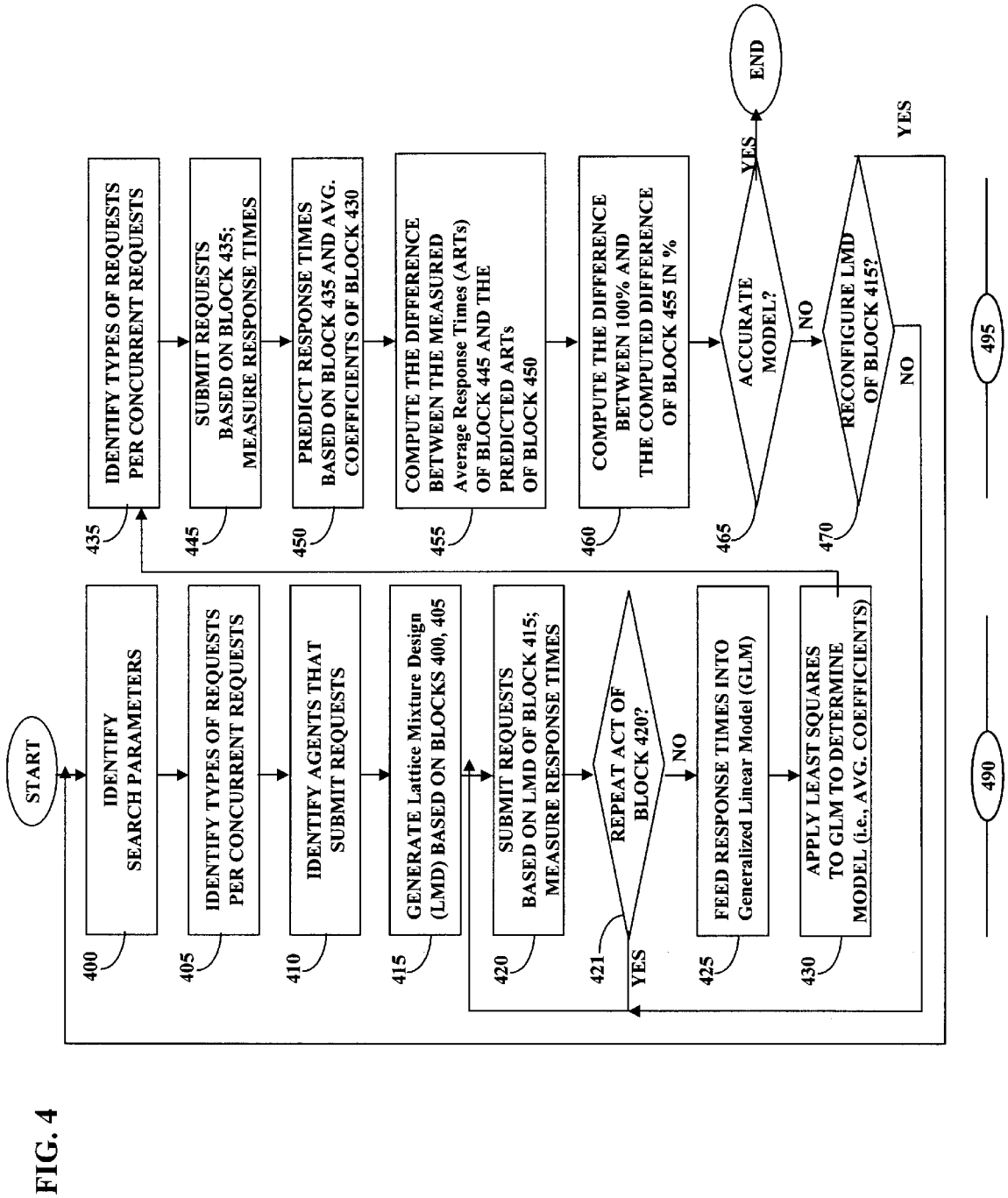
FIG. 4 depicts one embodiment of a flowchart to model the performance of computer servers.

FIG. 4 illustrates an exemplary method 490 for predicting the performance of server 100. In blocks 400 and 405 of method 490, an operator identifies the search parameters of a search interface, and the types of requests per concurrent requests, respectively. For instance, the operator may identify six search parameters, such as (1) a keyword; (2) two keywords; (3) three keywords; (4) four keywords; (5) a price range with a keyword; and (6) a price range with two keywords. For many search interfaces, these six search parameters are the most widely used. Nevertheless, the search parameters depend on the complexity of the search interface. The operator, thus, may identify different search parameters. It should be noted that logic operators (i.e., "or," "and") or basic operators (i.e., "within a certain number of words") connect the plurality of keywords. Also, the operator may identify the types of concurrent requests. For instance, a parameter "one" indicates that the agents attempt to submit one type of request at any one time, a parameter "two" indicates that the agents attempt to submit at most two types of requests at any one time, and so forth, for higher number parameters.

In order to submit a predetermined number of requests to server 100, the operator identifies the agents in block 410. Because the performance of server 100 is based on the response time of server 100 to concurrent requests, the agents submit the predetermined number (i.e., a known load) of requests, such as 210,000 e-commerce Web requests. This predetermined number may be compiled from actual data. For example, the predetermined number may be derived from a log of actual Web requests, where the log corresponds to a particular time period, shopping season, and/or marketing campaign. It should be noted that the identified (or predetermined) numbers, which are stated above, are programmable parameters, and are programmed to assist the operator of server 100 to allocate the resources of server 100.

FIG. 5 depicts a matrix (i.e., a lattice mixture design ("LMD")) used to model the performance of server 100. That is, LMD, which is based on the identified parameters, sets up the requests to server 100. The columns of the matrix represent the identified search parameters, which in this example is six; while the rows of the matrix represent the different requests. The rows are programmed based on the identified types of requests per concurrent requests, which in this example is two. Thus, the matrix of FIG. 5 comprises six columns and twenty-one rows. Each of rows 1–6 request one type of request. That is, the request of row 1 is a keyword (i.e., one type of Web request), while the request of row 6 is a price range with two keywords (i.e., one type of Web request). Moreover, each of rows 7–21 request two types of requests. That is, the requests of row 7 are (1) a keyword, and (2) two keywords, while the requests of row 21 are (1) a price range with a keyword, and (2) a price range with two keywords.

In block 415 of FIG. 4, the agents generate the LMD of FIG. 5. It should be noted that method 490 submits only a small number of requests relative to the possible combinations (i.e., permutations) of different types of requests, which is based on the search parameters of a search interface, for instance. Thus, the small number of requests to submit maximizes the use of the limited resources of the operator and reduces the time to predict the performance of server 100.

In block 420, the agents submit predetermined number of requests, which are based on the generated matrix. In this example, the agents submit 210,000 requests (or 10,000 Web requests per run of FIG. 5 (i.e., 210,000 Web requests/21 runs)). That is, for row 1, 10,000 requests are submitted using a keyword; for row 6,10,000 requests are submitted using a price range with two keywords. Further, for row 7, 5,000 requests are submitted using a keyword, and 5,000 requests are submitted using two keywords; for row 21, 5,000 requests are submitted using a price range with a keyword, and 5,000 requests are submitted using a price range with two keywords. For each run of FIG. 5, the agents submit concurrent, or close to concurrent requests (i.e., within a predetermined time range, such as one second), in order to accurately predict the performance of server 100. As noted above, the performance of server 100 is based on the response time of server 100 to concurrent requests of different types. For each request, then, response times of server 100 are measured by at least one processor (i.e., agent), which may comprise at least one of server 100, and computer 300. For each run, the average response times (i.e., sum of the measured response times over the number of concurrent requests) of server 100 are determined by the processor.

In block 421, the agents may repeat the act of block 420 in order to implement the "least squares" method to predict the performance of server 100 (see description below). The operator, for example, programs a "repeat" parameter, which identifies the number of times to repeat the act of block 420. In this example, the agents once again submit the predetermined number of requests of block 420. For each type of request, like in block 420, average response times of server 100 are determined. After repeating the act of block 420 for the identified number of times, method 490 proceeds to block 425.

In block 425, the average response times are manipulated using a generalized linear model ("GLM"), which is a variant of linear regression, as well as the "least squares" method, which endeavors to fit a line through a set of observations. In this embodiment, the GLM is of the form:

Average Response Time ("ART")=$c0+c1*f1+c2*f$ $2+c3*f3+c4*f4+$ $c5*f5+c6*f6+c7*f1*f$ $2+c8*f1*f3+c9*f1*f4+c10*$ $f1*f5+c11*f1*f$ $6+c12*f2*f3+c13*f2*f4+c14*f2*$ $f5+c15*f2*f6+$ $c16*f3*f4+c17*f3*f5+c18*f3*$ $f6+c19*f4*f5+$ $c20*f4*f6+c21*f5*f6$ wherein the coefficients c1 to c21 are unknown (c0=0), while the independent variables (i.e., f1 to f6) and the average response time ("ART") are known. That is, for the runs of FIG. 5, the independent variables of the ART equations are the values of the rows of the matrix. To illustrate, for run 1, the values of the independent variables are: f1=1.0; f2=0; f3=0; f4=0; f5=0; and f6=0. The ART equations in GLM form for block 420, which are based on the LMD of FIG. 5, are represented as follows:

ART1=$c1*f1=c1*1.0$;

ART2=$c2*f2=c2*1.0$;

ART3=$c3*f3=c3*1.0$;

ART4=$c4*f4=c4*1.0$;

ART5=$c5*f5=c5*1.0$;

ART6=$c6*f6=c6*1.0$;

ART7=$c1*f1+c2*f2+c7*f1*f2=c1*0.5+c2*0.5+c7*0.5*0.5$;

ART8=$c1*f1+c3*f3+c8*f1*f3=c1*0.5+c3*0.5+c8*0.5*0.5$;

ART9=$c1*f1+c4*f4+c9*f1*f4=c1*0.5+c4*0.5+c9*0.5*0.5$;

ART10=$c1*f1+c5*f5+c10*f1*f5=c1*0.5+c5*0.5+c10*0.5*0.5$;

ART11=$c1*f1+c6*f6+c11*f1*f6=c1*0.5+c6*0.5+c11*0.5*0.5$;

$ART12=c2*f2+c3*f3+c12*f2*f3=c2*0.5+c3*0.5+c12*0.5*0.5;$ $ART13=c2*f2+c4*f4+c13*f2*f4=c2*0.5+c4*0.5+c13*0.5*0.5;$ $ART14=c2*f2+c5*f5+c14*f2*f5=c2*0.5+c5*0.5+c14*0.5*0.5;$ $ART15=c2*f2+c6*f6+c15*f2*f6=c2*0.5+c6*0.5+c15*0.5*0.5;$ $ART16=c3*f3+c4*f4+c16*f3*f4=c3*0.5+c4*0.5+c16*0.5*0.5;$ $ART17=c3*f3+c5*f5+c17*f3*f5=c3*0.5+c5*0.5+c17*0.5*0.5;$ $ART18=c3*f3+c6*f6+c18*f3*f6=c3*0.5+c6*0.5+c18*0.5*0.5;$ $ART19=c4*f4+c5*f5+c19*f4*f5=c4*0.5+c5*0.5+c19*0.5*0.5;$ $ART20=c4*f4+c6*f6+c20*f4*f6=c4*0.5+c6*0.5+c20*0.5*0.5;$ and $ART21=c5*f5+c6*f6+c21*f5*f6=c5*0.5+c6*0.5+c21*0.5*0.5.$ Moreover, the ART equations in GLM form for block 421, which are also based on the LMD of FIG. 5, are represented as follows:

$ART22=c1*f1=c1*1.0;$ $ART23=c2*f2=c2*1.0;$ $ART24=c3*f3=c3*1.0;$ $ART25=c4*f4=c4*1.0;$ $ART26=c5*f5=c5*1.0;$ $ART27=c6*f6=c6*1.0;$ $ART28=c1*f1+c2*f2+c7*f1*f2=c1*0.5+c2*0.5+c7*0.5*0.5;$ $ART29=c1*f1+c3*f3+c8*f1*f3=c1*0.5+c3*0.5+c8*0.5*0.5;$ $ART30=c1*f1+c4*f4+c9*f1*f4=c1*0.5+c4*0.5+c9*0.5*0.5;$ $ART31=c1*f1+c5*f5+c10*f1*f5=c1*0.5+c5*0.5+c10*0.5*0.5;$ $ART32=c1*f1+c6*f6+c11*f1*f6=c1*0.5+c6*0.5+c11*0.5*0.5;$ $ART33=c2*f2+c3*f3+c12*f2*f3=c2*0.5+c3*0.5+c12*0.5*0.5;$ $ART34=c2*f2+c4*f4+c13*f2*f4=c2*0.5+c4*0.5+c13*0.5*0.5;$ $ART35=c2*f2+c5*f5+c14*f2*f5=c2*0.5+c5*0.5+c14*0.5*0.5;$ $ART36=c2*f2+c6*f6+c15*f2*f6=c2*0.5+c6*0.5+c15*0.5*0.5;$ $ART37=c3*f3+c4*f4+c16*f3*f4=c3*0.5+c4*0.5+c16*0.5*0.5;$ $ART38=c3*f3+c5*f5+c17*f3*f5=c3*0.5+c5*0.5+c17*0.5*0.5;$ $ART39=c3*f3+c6*f6+c18*f3*f6=c3*0.5+c6*0.5+c18*0.5*0.5;$ $ART40=c4*f4+c5*f5+c19*f4*f5=c4*0.5+c5*0.5+c19*0.5*0.5;$ $ART41=c4*f4+c6*f6+c20*f4*f6=c4*0.5+c6*0.5+c20*0.5*0.5;$ and $ART42=c5*f5+c6*f6+c21*f5*f6=c5*0.5+c6*0.5+c21*0.5*0.5.$ Thus, there are 42 ART equations and 21 coefficients. The coefficients vary (i.e., are not constants) because, as stated above, the performance of server 100 fluctuates based on the concurrent Web requests of different types. Since the number of ART equations exceed the number of coefficients, the "least squares" method is implemented to determine the average coefficients, which are used to predict the performance (i.e., average response times) of server 100.

In FIG. 4, an exemplary method 495 validates the model (i.e., the determined average coefficients). In block 435 of method 495, like in block 405 of method 490, the operator identifies the types of requests per concurrent requests. The identified parameter of block 435 may be a programmable parameter, or even a random parameter, which the agents may determine. Further, the identified parameter of block 435 may differ in value from the identified parameter of block 405 in order to determine the accuracy of the model.

In block 445 of method 490, like in block 420 of method 495, the agents submit a r predetermined number of requests, which are based on the parameter of block 400 (i.e., identified search parameters of the search interface) and the parameter of block 435 (i.e., identified types of requests per concurrent requests). As stated above, for each type of request, the agents submit concurrent, or close to concurrent, requests. For each request, response times of server 100 are measured, for example, by at least one processor (i.e., agent). For each type of request, then, average response times (i.e., sum of the measured response times over the number of concurrent requests) of server 100 are determined.

In block 450, using a GLM, the agents predict the response times for the requests based on the model (i.e., the determined average coefficients) of the performance of server 100 and the parameter of block 435. As noted above, the GLM is of the form:

$ART=c0+c1*f1+c2*f2+...$ wherein the coefficients (i.e., c0, c1, c2, etc.) and the independent variables (i.e., f1, f2, etc.), which correspond to the parameter of block 435, are known. Thus, the agents solve ART equations, as shown above, in order to predict average response times (i.e., the unknown variables).

The accuracy of the model of the performance of server 100 is based on the difference between the measured average response times of block 445 and the predicted average response times of block 450. In block 455, the agents compute this difference. Then, the agents compute the ratio of the computed difference (i.e., numerator) and the measured average response times (i.e., denominator) in order to determine the accuracy of the model. In block 460, the agents compute the difference between 100% and the computed ratio, which is the computed difference between the measured average response times and the predicted average response times in percentage.

In block 465, the accuracy of the model is evaluated. If the accuracy of the model is not within an operator-specified acceptable range (i.e., greater than 95%), then method 495 proceeds to block 470. If the accuracy of the model is within the acceptable range, then the operator may use the model of the performance of server 100 to allocate their limited resources with high efficiency. In one exemplary shopping service, for instance, the model of the performance of a computer server was determined to have an accuracy of 98%.

In block 470 of method 495, method 490 is repeated in order to increase the accuracy of the model. If the operator identifies that the LMD of block 415 should be re-used, then method 495 proceeds to block 420. If the operator identifies that a different LMD should be generated, then method 495 proceeds to block 400. In this example, if the accuracy of the model failed to fall within the operator-specified acceptable range, then method 495 would proceed to block 400. In particular, in block 405, the identified parameter (i.e., the types of requests per concurrent requests) would be increased in order to more fully consider the impact of the types of requests on the performance of server 100.

Although this invention has been shown in relation to particular embodiments, it should not be considered so limited. Rather, the invention is limited only by the scope of the appended claims and their equivalents.

What is claimed is:

1. A computer implemented method for measuring and predicting a performance of a server comprising the computer implemented steps of:
   submitting a first predetermined number of requests of a first predetermined number of different types of requests to a server;
   measuring first response times of the server to the submitted first predetermined number of requests;
   calculating a first set of average coefficients using a model based on the measured first response times;
   predicting first average response times of the server using the model based on the first predetermined number of requests, the first predetermined number of different types of requests, and the first set of average coefficients; and
   generating a performance model of the server based on the measured first response times and the predicted first average response times.

2. The method of claim 1, further comprising, determining the a capacity of the server based on the first predetermined number of requests and the predicted first average response times.

3. The method of claim 1, wherein the server comprises a Web server.

4. The method of claim 1, wherein the first predetermined number of requests comprise e-commerce requests.

5. The method of claim 1, wherein the first predetermined numbers of different types of requests are programmable parameters of a program implemented by the computer.

6. The method of claim 1, wherein the first predetermined number of different types of requests comprise at least one of a price range, a keyword, and a plurality of keywords.

7. The method of claim 1, further comprising, generating a matrix to set the first predetermined number of requests to submit to the server.

8. The method of claim 1, further comprising, using a generalized linear model to calculate the first set of average coefficients and to predict the first average response times.

9. The method of claim 1, further comprising,
   submitting a second predetermined number of requests of a second predetermined number of different types of requests to the server;
   measuring second response times of the server to the submitted second predetermined number of requests;
   calculating a second set of average coefficients using a model based on the measured second response times;
   predicting second average response times of the server using the model based on the second predetermined number of requests, the second predetermined number of different types of requests and the second set of average coefficients; and
   validating the performance model of the server based on the measured second response times and the predicted second average response times.

10. The method of claim 9, wherein the second predetermined number of different types of requests is a random number.

11. The method of claim 9, further comprising, using a generalized linear model to calculate the second set of average coefficients and to predict the second average response times.

12. A machine-readable medium comprising encoded information, which when read by a machine causes the acts of:
   submitting a first predetermined number of requests of a first predetermined number of different types of requests to a server;
   measuring first response times of the server to the submitted first predetermined number of requests;
   calculating a first set of average coefficients using a model based on the measured first response times;
   predicting first average response times of the server using the model based on the first predetermined number of requests, the first predetermined number of different types of requests, and the first set of average coefficients; and
   generating a performance model of the server based on the measured first response times and the predicted first average response times.

13. The machine-readable medium of claim 12, further comprising, determining the a capacity of the server based on the first predetermined number of requests and the predicted first average response times.

14. The machine-readable medium of claim 12, wherein the server comprises a Web server.

15. The machine-readable medium of claim 12, wherein the first predetermined number requests comprise e-commerce requests.

16. The machine-readable medium of claim 12, wherein the first predetermined numbers of different types of requests are programmable parameters of a program implemented by the computer.

17. The machine-readable medium of claim 12, wherein the first predetermined number of different types of requests comprise at least one of a price range, a keyword, and a plurality of keywords.

18. The machine-readable medium of claim 12, further comprising, generating a matrix to set the first predetermined number of requests to submit to the server.

19. The machine-readable medium of claim 12, further comprising, using a generalized linear model to calculate the first set of average coefficients and to predict the first average response times.

20. The machine-readable medium of claim 12, further comprising,
   submitting a second predetermined number of requests of a second predetermined number of different types of requests to the server;
   measuring second response times of the server to the submitted second predetermined number of requests;
   calculating a second set of average coefficients using a model based on the measured second response times;
   predicting second average response times of the server using the model based on the second predetermined number of requests, the second predetermined number of different types of requests and the second set of average coefficients; and
   validating the performance model of the server based on the measured second response times and the predicted second average response times.

21. The machine-readable medium of claim 20, wherein the second predetermined number of different types of requests is a random number.

22. A system comprising:
   a server; and
   a plurality of computers adapted to communicate with the server, each of the computers includes at least one agent, a first agent adapted to submit a first predetermined number of requests of a first predetermined number of different types of requests to the server, a second agent adapted to measure first response times of the server to the submitted first predetermined number of requests, and one of the computers adapted to calculate a first set of average coefficients and to predict first average response times of the server using a model based on the first predetermined number of requests, the first predetermined number of different types of requests, and the first set of average coefficients, and generate a performance model of the server based on the measured first response times and the predicted first average response times.

23. The system of claim 22, wherein one of the computers is adapted to determine a capacity of the server based on the first predetermined number of requests and the predicted first average response times.

24. The system of claim 22, wherein the server comprises a Web server.

25. The system of claim 22, wherein the first predetermined number of requests comprise e-commerce requests.

26. The system of claim 22, wherein the first predetermined numbers of different types of requests are programmable parameters of a program implemented by the computer.

27. The system of claim 22, wherein the first predetermined number of different types of requests comprise at least one of a price range, a keyword, and a plurality of keywords.

28. The system of claim 22, wherein the first agents is adapted to generate a matrix to set the first predetermined number of requests to submit to the server.

29. The system of claim 22, wherein one of the computers is adapted to use a generalized linear model to calculate the first set of average coefficients and to predict the first average response times.

30. The system of claim 22, further comprising, the first agent adapted to submit a second predetermined number of requests of a second predetermined number of different types of requests to the server, the second agent adapted to measure second response times of the server to the submitted second predetermined number of requests, and one of the computers adapted to calculate a second set of average coefficients and to predict second average response times of the server using a model based on the second predetermined number of requests, the second predetermined number of different types of requests and the second set of average coefficients, and to validate the performance model of the server based on the measured second response times and the predicted second average response times.

31. The system of claim 30, wherein the second predetermined number of different types of requests is a random number.

32. The method of claim 30, further comprising, using a generalized linear model to calculate the second set of average coefficients and to predict the second average response times.

* * * * *